United States Patent [19]

Watanabe et al.

[11] Patent Number: 4,951,959
[45] Date of Patent: Aug. 28, 1990

[54] SUSPENSION SYSTEMS FOR VEHICLES

[75] Inventors: Kenichi Watanabe, Hiroshima; Takeshi Edahiro, Higashihiroshima; Haruyuki Taniguchi, Hiroshima, all of Japan

[73] Assignee: Mazda Motor Corporation, Hiroshima, Japan

[21] Appl. No.: 313,496

[22] Filed: Feb. 22, 1989

[30] Foreign Application Priority Data

Mar. 1, 1988 [JP] Japan .................................. 63-45764
Mar. 1, 1988 [JP] Japan .................................. 63-45767

[51] Int. Cl.⁵ .................................................. B62D 7/18
[52] U.S. Cl. .................................................. 280/96.1
[58] Field of Search ...................... 280/716, 96.1, 668, 280/660, 671, 673, 719

[56] References Cited

U.S. PATENT DOCUMENTS

| | | | |
|---|---|---|---|
| 2,882,065 | 4/1959 | von Rucker | 280/96.1 |
| 3,563,564 | 2/1971 | Bartkowiak | 280/96.1 |
| 3,801,124 | 4/1974 | Afanador et al. | 280/96.1 |
| 4,155,566 | 5/1979 | Kroniger | 280/96.1 |
| 4,565,389 | 1/1986 | Kami et al. | 280/688 |

Primary Examiner—Richard A. Bertsch
Attorney, Agent, or Firm—Sixbey, Friedman, Leedom & Ferguson

[57] ABSTRACT

A suspension system for a vehicle comprises a wheel supporting structure provided for supporting a steerable wheel rotatably and composed of upper and lower support members, an upper suspension member extending from a body of the vehicle for connecting the upper support member with the body in such a manner that the upper support member is movable up and down in relation to the body, a lower suspension member extending from the body for connecting the lower support member with the body in such a manner that the lower support member is movable up and down in relation to the body, and an elastic joint structure provided for coupling the lower support member with the upper support member so that the lower support member is engaged with the upper support member only through the elastic joint structure and constituted to be relatively flexible in a vehicle longitudinal direction and relatively hard in a vehicle transverse direction.

18 Claims, 10 Drawing Sheets

SUSPENSION SYSTEMS FOR VEHICLES

BACKGROUND OF THE INVENTION

1. Field of the Invention

The present invention relates generally to suspension systems for vehicles, and more particularly is directed to an improvement in a suspension system used for supporting each of steerable wheels in a vehicle.

2. Description of the Prior Art

A suspension system for supporting each of steerable front wheels of a vehicle is provided with a knuckle structure which is supported to be able to move up and down and to swing with an axis of oscillation extending up and down in relation to a body of the vehicle by suspension arms connected to the body and has a wheel spindle for supporting the steerable front wheel. The knuckle structure is further provided with a knuckle arm extending therefrom to be connected with a tie rod which is moved to steer the steerable front wheel supported by the knuckle structure.

In general, for bringing stabilized controllability and comfortableness in driving on a vehicle, a suspension system for supporting each of wheels of the vehicle is required to permit the wheel supported thereby to move backward and forward easily when a force working in the vehicle longitudinal direction is applied to the wheel and to prevent the wheel from moving freely when a force working in the vehicle transverse direction is applied to the wheel.

In view of such requirements to suspension systems as mentioned above, there has been previously proposed a suspension system for a vehicle which is operative to support a steerable front wheel of the vehicle in such a manner that the steerable front wheel is easy to move in the vehicle longitudinal direction and hard to move in the vehicle transverse direction, as disclosed, for example, in U.S. Pat. Nos. 4,155,566 or 2,882,065. In the suspension system thus proposed previously, a knuckle structure is divided into upper and lower knuckle members and the upper knuckle member is connected through an elastic member with the lower knuckle member so that the whole knuckle structure becomes relatively flexible in the vehicle longitudinal direction and relatively hard in the vehicle transverse direction.

In more detail, in the suspension system disclosed in U.S. Pat. No. 4,155,566, a lower knuckle member which is connected through a lower suspension arm with a body of the vehicle is provided with a wheel spindle on which the steerable front wheel is mounted, a knuckle arm connected to a tie rod and a joint pin which extends toward the inside of the body in the vehicle transverse direction. The joint pin extending from the lower knuckle member is coupled rotatably with the lower portion of an upper knuckle member which is connected through an upper suspension arm with the body. The lower knuckle member is further provided with a supporting sleeve member which is incorporated with the lower knuckle member to surround the lower portion of the upper knuckle member with an elastic sleeve member disposed between the inner surface of the supporting sleeve member and the outer surface of the lower portion of the upper knuckle member.

With such an arrangement, the lower knuckle member is able to be easily swung with the joint pin as the center of oscillation within an angular area limited based on elastic deformations of the elastic sleeve member and hard to move the direction along which the joint pin extends, so that the steerable front wheel supported by the lower knuckle member is easy to be move backward and forward by a force applied thereto in the vehicle longitudinal direction and hard to be moved laterally by a force applied thereto in the vehicle transverse direction.

In the suspension system disclosed in U.S. Pat. No. 2,882,065, a lower knuckle member is also provided with a wheel spindle, a knuckle arm and a joint pin which extends toward the inside of a body of the vehicle in the vehicle transverse direction to be coupled rotatably with the lower portion of an upper knuckle member. The lower knuckle member is further provided with front and rear supporting portions facing each other in the vehicle longitudinal direction with the upper knuckle member between, and a pair of elastic spacers are disposed respectively between the front supporting portion and the upper knuckle member and between the upper knuckle member and the rear supporting portion.

With such an arrangement, the lower knuckle member having the wheel spindle on which the steerable front wheel is mounted is permitted to move easily in the vehicle longitudinal direction and prevented from moving freely in the vehicle transverse direction.

However, in the event of the suspension systems proposed previously as described above, the knuckle structure is complicated in construction and thereby the production cost of the system is increased. The joint pin used for connecting the lower knuckle member with the upper knuckle member is required to be constituted with high precision because the movement of the knuckle structure in the vehicle longitudinal direction is caused by the lower knuckle member moving to swing with the joint pin as the center of oscillation in relation to the upper knuckle member. This results in a problem of difficulties in manufacture in case of practical use of the previously proposed suspension systems. Further, each of the upper and lower knuckle members is anticipated to be prevented by the joint pin connected with the lower portion of the upper knuckle member from inclining toward the inside or outside of the body of the vehicle, that is, the joint pin and the lower portion of the upper knuckle member coupled with the joint pin are expected to maintain the steerable front wheel to be appropriate in its camber when the steerable front wheel is almost zero in steering angle. However, the joint pin and the lower portion of the upper knuckle member must be engaged with each other so as to have a certain clearance therebetween in order to permit the joint pin to rotate, and therefore the steerable front wheel is apt to be varied in its camber under a condition in which the steerable front wheel is almost zero in steering angle.

OBJECTS AND SUMMARY OF THE INVENTION

Accordingly, it is an object of the present invention to provide a suspension system for a vehicle by which a steerable wheel of the vehicle is supported to be easy to move in a vehicle longitudinal direction and hard to move in a vehicle transverse direction and which avoids the aforementioned problems and disadvantages encountered with the prior art.

Another object of the present invention is to provide a suspension system for a vehicle by which a steerable wheel of the vehicle is supported to be easy to move in a vehicle longitudinal direction and hard to move in a vehicle transverse direction and which is simple in configuration and can be obtained easily without any particular difficulties in manufacture.

A further object of the present invention is to provide a suspension system for a vehicle in which a wheel supporting structure is composed of upper and lower members connected with each other for supporting a steerable wheel of the vehicle so as to cause the same to be easy to move in a vehicle longitudinal direction and hard to move in a vehicle transverse direction and which can keep surely the steerable wheel appropriate in its camber when the steerable wheel is almost zero in steering angle with a relatively simple configuration.

According to the present invention, there is provided a suspension system for a vehicle comprising a wheel supporting structure provided for supporting a steerable wheel rotatably and composed of upper and lower support members, an upper suspension member extending to be movable up and down from a body of the vehicle for connecting the upper support member of the wheel supporting structure with the body in such a manner that the upper support member is movable up and down in relation to the body, a lower suspension member extending to be movable up and down from the body for connecting the lower support member of the wheel supporting structure with the body in such a manner that the lower support member is movable up and down in relation to the body, and an elastic joint structure provided for coupling the lower support member of the wheel supporting structure with the upper support member of the wheel supporting structure so that the lower support member is engaged with the upper support member only through the elastic joint structure and constituted to be relatively flexible in a vehicle longitudinal direction and relatively hard in a vehicle transverse direction.

In an embodiment of suspension system according to the present invention, the elastic joint structure comprises upper and lower elastically coupling arrangements which are provided respectively at different positions separated along the wheel supporting structure and each of which is formed to be relatively flexible in the vehicle longitudinal direction and relatively hard in the vehicle transverse direction.

With the suspension system thus constituted in accordance with the present invention, such a requirement in wheel support that the steerable wheel is to be supported to be easy to move in the vehicle longitudinal direction and hard to move in the vehicle transverse direction is satisfied by the wheel support structure having the upper and lower support members engaged with each other only through the elastic joint structure which is constituted to be relatively flexible in the vehicle longitudinal direction and relatively hard in the vehicle transverse direction.

In addition, since the upper and lower support members are not engaged directly with each other but engaged with each other only through the elastic joint structure, each of the upper and lower support members is not required to be formed particularly with high precision. Accordingly, the suspension system for a vehicle according to the present invention can be made simple in configuration and easily manufactured.

Further, in the embodiment, since the upper and lower support members of the wheel supporting structure are coupled with each other through the upper and lower elastically coupling arrangements constituting the elastic joint structure at two separated positions, the wheel supporting structure is hard to incline toward the inside or outside of the body of the vehicle so as to keep the steerable wheel supported rotatably thereby appropriate in its camber when the steerable wheel is almost zero in steering angle.

The above, and other objects, features and advantages of the present invention will become apparent from the following detailed description which is to be read in conjunction with the accompanying drawings.

DESCRIPTION OF THE PREFERRED EMBODIMENTS

Figure 1:
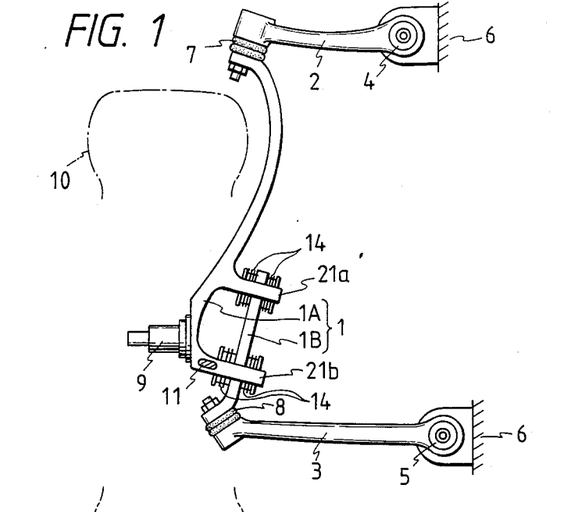
FIG. 1 is a front view showing a first embodiment of suspension system for a vehicle according to the present invention.
Figure 2:
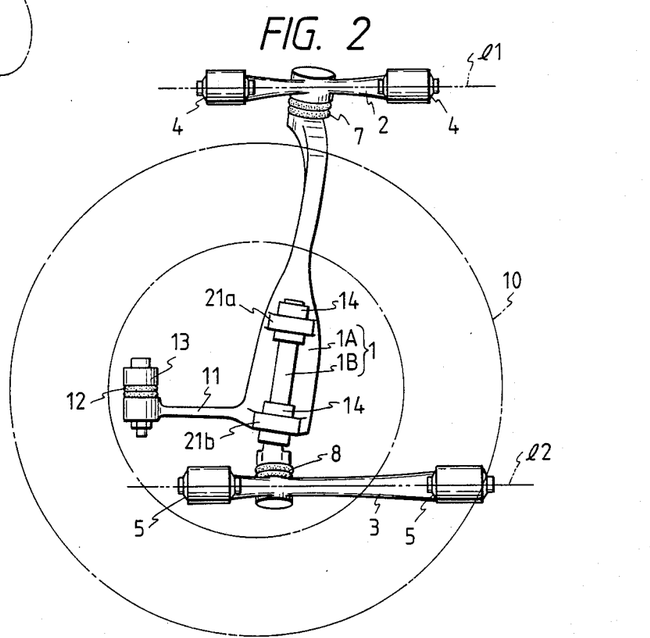
FIG. 2 is a side view showing the first embodiment.

FIGS. 1 and 2 show a first embodiment of suspension system of a vehicle according to the present invention.

Referring to FIGS. 1 and 2, a knuckle structure 1 which acts as a wheel supporting structure and is composed of upper and lower knuckle members 1A and 1B is provided for supporting a steerable front wheel 10 of a vehicle. The upper end portion of the upper knuckle member 1A is connected through a ball joint 7 with the outer end portion of an upper suspension arm 2 which extends outwardly from a body 6 of the vehicle in a vehicle transverse direction and the lower end portion of the lower knuckle member 1B is connected through a ball joint 8 with the outer end portion of a lower suspension arm 3 which extends outwardly from the body 6 in the vehicle transverse direction. The upper suspension arm 2 is shaped into a so called A-type arm to have a couple of forked inner end portions and each of the forked inner end portions is coupled through an elastic bushing sleeve 4 with the body 6 to be rotatable around an imaginary axis 11 extending in a vehicle longitudinal direction, so that the upper suspension arm 2 is swingable up and down with the imaginary axis 11 as the axis of oscillation and the upper knuckle member 1A is supported by the upper suspension arm 2 to be movable up and down in relation to the body 6. The lower suspension arm 3 is also shaped into an A-type arm to have a couple of forked inner end portions and each of the forked inner end portions is coupled through an elastic bushing sleeve 5 with the body 6 to be rotatable around an imaginary axis 12, so that the lower suspension arm 3 is swingable up and down with the imaginary axis 12 as the axis of oscillation and the lower knuckle member 1B is supported by the lower suspension arm 3 to be movable up and down in relation to the body 6.

The upper knuckle member 1A is provided at its lower end portion with a wheel spindle 9 extending outwardly in the vehicle transverse direction and a knuckle arm 11 extending forward in the vehicle longitudinal direction. The steerable front wheel 10 is mounted on the wheel spindle 9 to be rotatable as a driven wheel. The end portion of the knuckle arm 11 is connected through a ball joint 12 with a tie rod 13 which constitutes a portion of a steering mechanism employed in the vehicle.

The upper knuckle member 1A is further provided with upper and lower connecting projections 21a and 21b, and the upper and lower knuckle members 1A and 1B are coupled with each other through an elastic joint structure composed of upper and lower elastically coupling arrangements including the upper and lower connecting projections 21a and 21b, respectively.

Figure 3:
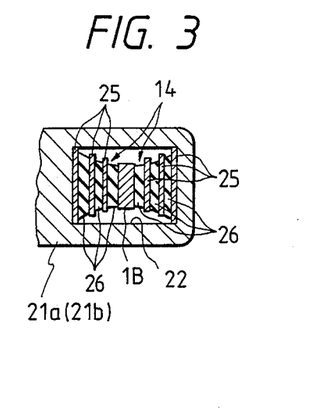
FIG. 3 is a fragmentary cross-sectional view showing a portion of the first embodiment shown in FIGS. 1 and 2.
Figure 4:
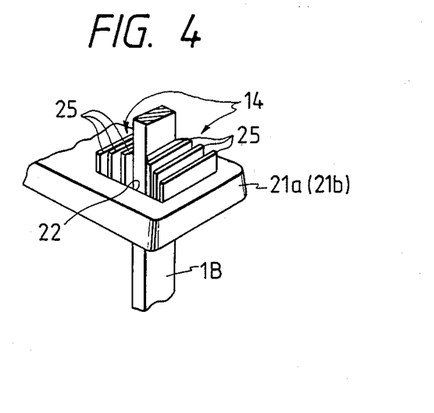
FIG. 4 is a fragmentary perspective view showing a portion of the first embodiment shown in FIGS. 1 and 2.

In the upper elastically coupling arrangement including the upper connecting projection 21a, as shown in FIGS. 3 and 4, the upper portion of the lower knuckle member 1B is inserted into an engaging opening 22 formed on the upper connecting projection 21a and coupled with the upper connecting projection 21a through elastic couplers 14 provided in the engaging opening 22. Each of the elastic couplers 14 comprises a plurality of metal plates 25 and a plurality of elastic plates 26, such as rubber plates, which are arranged alternately to form an incorporated layer-built block. In the engaging opening 22 formed on the upper connecting projection 21a, the elastic couplers 14 are so positioned that the metal plates 25 and elastic plates 26 are substantially oriented to be parallel to each other in the vehicle longitudinal direction and to make a plurality of layers in the vehicle transverse direction, and further disposed to contact respectively with both inner walls facing each other in the vehicle transverse direction to form the engaging opening 22 but not to contact with both inner walls facing each other in the vehicle longitudinal direction to form the engaging opening 22. Accordingly, the upper elastically coupling arrangement is constituted to be flexible in the vehicle longitudinal direction and hard in the vehicle transverse direction, and therefore the upper portion of the lower knuckle member 1B is coupled through the upper elastically coupling arrangement with the upper knuckle member 1A so as to be easy to move in the vehicle longitudinal direction and hard to move in the vehicle transverse direction.

Further, in the lower elastically coupling arrangement including the lower connecting projection 21b, as shown also in FIGS. 3 and 4, an engaging opening 22 and elastic couplers 14 which correspond to those provided in the upper elastically coupling arrangement are also provided as marked with the same references. The lower portion of the lower knuckle member 1B is inserted into the engaging opening 22 formed on the lower connecting projection 21b and coupled with the lower connecting projection 21b through the elastic couplers 14 provided in the engaging opening 22 in the same manner as those in the upper elastically coupling arrangement. Accordingly, the lower elastically coupling arrangement is also constituted to be flexible in the vehicle longitudinal direction and hard in the vehicle transverse direction, and therefore the lower portion of the lower knuckle member 1B is coupled through the lower elastically coupling arrangement with the upper knuckle member 1A so as to be easy to move in the vehicle longitudinal direction and hard to move in the vehicle transverse direction.

With the first embodiment constituted as described above, when an external force working in the vehicle longitudinal direction is applied to the steerable front wheel 10, the knuckle structure 1 is operative to have easily such deformation at the elastic joint structure as to move the wheel spindle 9 together with the steerable front wheel 10 mounted thereon in the vehicle longitudinal direction, and therefore the steerable front wheel 10 is easily moved in the vehicle longitudinal direction in response to the external force. The deformation of the knuckle structure 1 can be controlled by selecting the elastic hardness of each of the upper and lower elastically coupling arrangements constituting the elastic joint structure. The upper and lower elastically coupling arrangements are not only provided with the same elastic hardness but caused to be different in elastic hardness from each other, for example, in such a manner that the elastic hardness of the upper elastically coupling arrangement is selected to be higher than that of the lower elastically coupling arrangement.

Further, since the upper and lower knuckle members 1A and 1B constituting the knuckle structure 1 are connected with each other through the upper and lower elastically coupling arrangements constituting the elastic joint structure, each of which is formed to be relatively flexible in the vehicle longitudinal direction and relatively hard in the vehicle transverse direction, the knuckle structure 1 is hard to incline toward the inside or outside of the body 6 and operative to keep the steerable front wheel 10 appropriate in its camber when the steerable front wheel 10 is almost zero in steering angle.

FIGS. 5 to 16 show second to tenth embodiments of suspension system of a vehicle according to the present invention, and in FIGS. 5 to 16, members, parts and portions corresponding to those shown in FIGS. 1 to 4 are marked with the same references and further description thereof will be omitted.

Figure 5:
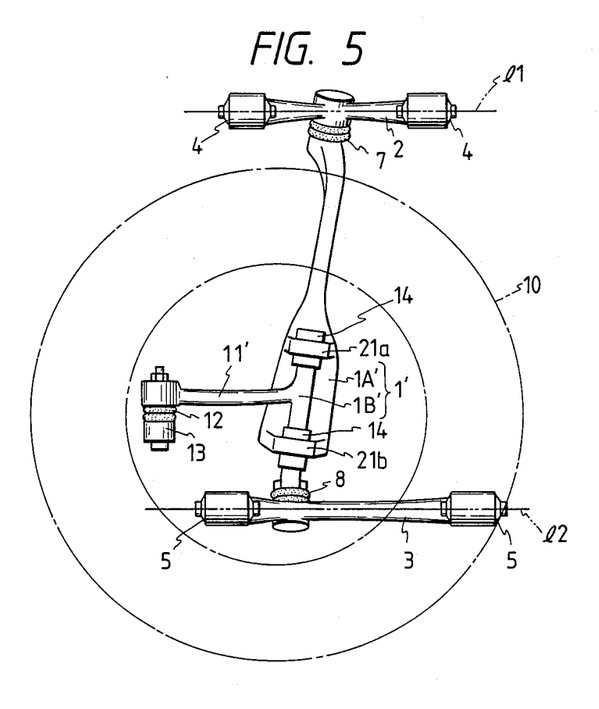
FIG. 5 is a side view showing a second embodiment of suspension system for a vehicle according to the present invention.

FIG. 5 shows the second embodiment. In the second embodiment, a knuckle structure 1' which comprises upper and lower knuckle members 1A' and 1B' is provided. The upper knuckle member 1A' is provided with a wheel spindle (not shown in FIG. 5) on which a steerable front wheel 10 is mounted and the upper and lower connecting projections 21a and 21b, and the lower knuckle member 1B' is provided with a knuckle arm 11' which is connected through a ball joint 12 with a tie rod 13. Other potions are constituted in the same manner as the first embodiment.

Figure 6:
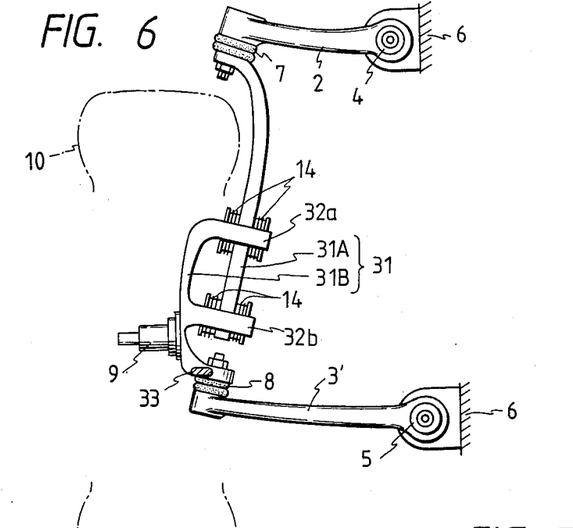
FIG. 6 is a front view showing a third embodiment of suspension system for a vehicle according to the present invention.
Figure 7:
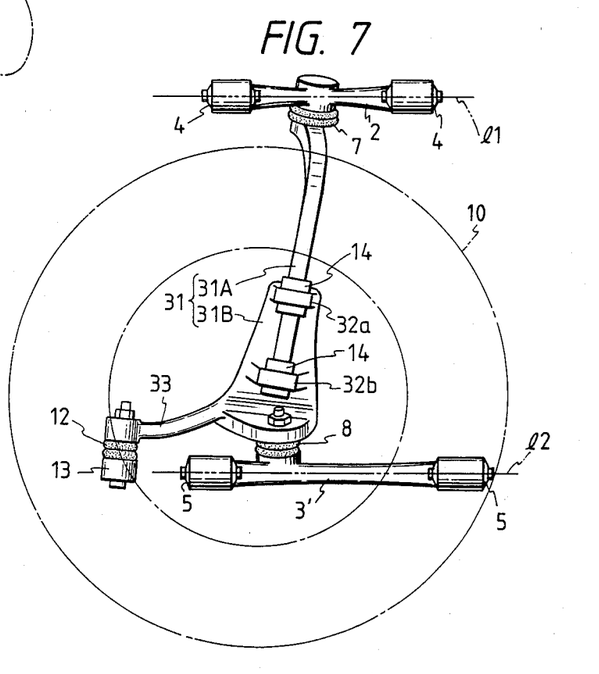
FIG. 7 is a side view showing the third embodiment.

FIGS. 6 and 7 show the third embodiment. In the third embodiment, a knuckle structure 31 which comprises an upper knuckle member 31A supported by an upper suspension arm 2 and a lower knuckle member 31B supported by a lower suspension arm 3', is provided.

The lower knuckle member 31B is provided with a wheel spindle 9 on which a steerable front wheel 10 is mounted and a knuckle arm 33 which is connected through a ball joint 12 with a tie rod 13. Further, the lower knuckle member 31B is also provided with upper and lower connecting projections 32a and 32b, and the upper and lower knuckle members 31A and 31B are coupled with each other through an elastic joint structure composed of upper and lower elastically coupling arrangements including the upper and lower connecting projections 32a and 32b, respectively.

In the upper elastically coupling arrangement including the upper connecting projection 32a, a first portion of the upper knuckle member 31A is coupled through elastic couplers 14 with the upper connecting projection 32a, and in the lower elastically coupling arrangement including the lower connecting projection 32b, a second portion of the upper knuckle member 31A, which is lower than the first portion of the upper knuckle member 31A, is coupled through elastic couplers 14 with the lower connecting projection 32b. The upper and lower elastically coupling arrangements including respectively the upper and lower connecting projections 32a and 32b provided on the lower knuckle member 31B, are operative to work similarly to the upper and lower elastically coupling arrangements in the first embodiment, respectively.

Figure 8:
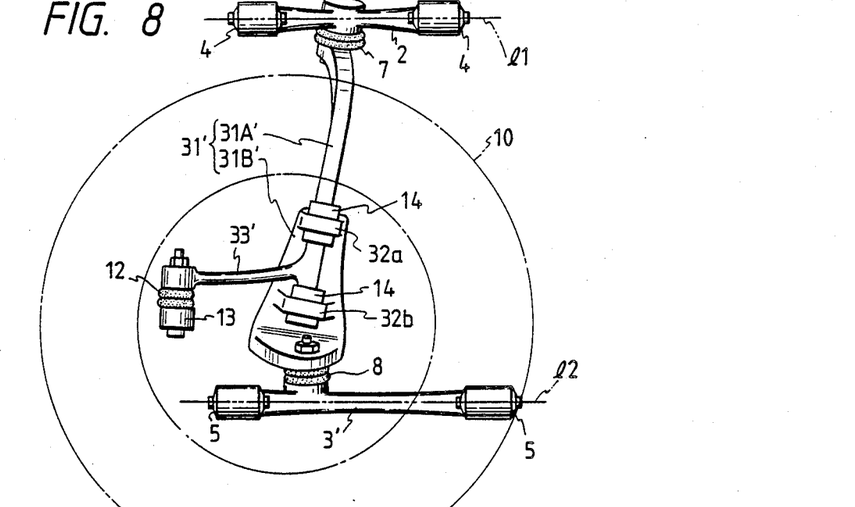
FIG. 8 is a side view showing a fourth embodiment of suspension system for a vehicle according to the present invention.

FIG. 8 shows the fourth embodiment. In the fourth embodiment, a knuckle structure 31' which comprises upper and lower knuckle members 31A' and 31B' is provided. The upper knuckle member 31A' is provided with a knuckle arm 33' which is connected through a ball joint 12 with a tie rod 13, and the lower knuckle member 31B' is provided with a wheel spindle (not shown in FIG. 8) on which a steerable front wheel 10 is mounted and upper and lower connecting projections 32a and 32b. Other potions are constituted in the same manner as the third embodiment.

Figure 9:
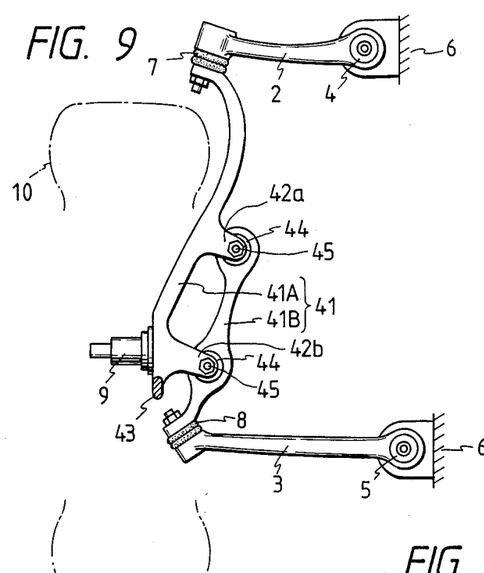
FIG. 9 is a front view showing a fifth embodiment of suspension system for a vehicle according to the present invention.
Figure 10:
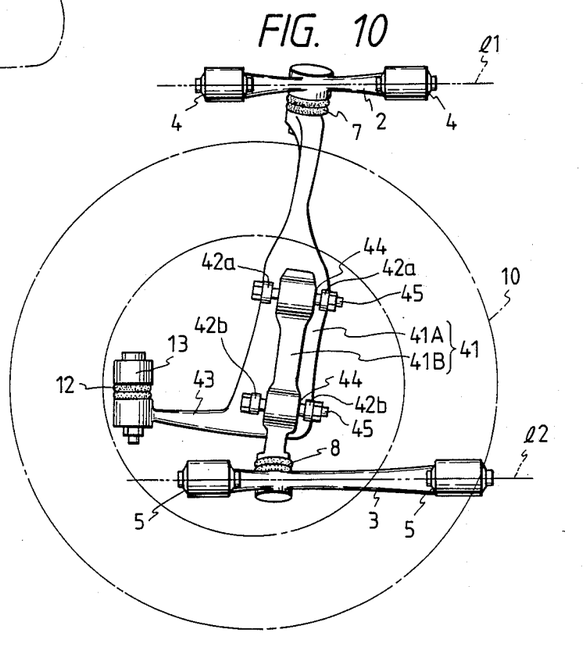
FIG. 10 is a side view showing the fifth embodiment.

FIGS. 9 and 10 show the fifth embodiment. In the fifth embodiment, a knuckle structure 41 which comprises an upper knuckle member 41A and a lower knuckle member 41B is provided.

The upper knuckle member 41A is provided with a wheel spindle 9 on which a steerable front wheel 10 is mounted and a knuckle arm 43 connected through a ball joint 12 with a tie rod 13. Further, the upper knuckle member 41A is also provided with a pair of upper connecting projections 42a and a pair of lower connecting projections 42b, and the upper and lower knuckle members 41A and 41B are coupled with each other through an elastic joint structure composed of an upper elastically coupling arrangement including the upper connecting projections 42a and a lower elastically coupling arrangement including the lower connecting projections 42b.

In the upper elastically coupling arrangement including the upper connecting projections 42a, the upper portion of the lower knuckle member 41B is coupled with the upper connecting projections 42a through an elastic bushing sleeve 44 oriented to extend axially in the vehicle longitudinal direction and a bolt 45 which passes through the upper connecting projections 42a and the elastic bushing sleeve 44. The upper portion of the lower knuckle member 41B is positioned between the upper connecting projections 42a with a space at each side thereof and the bolt 45 is disposed to extend in the vehicle longitudinal direction. Accordingly, the upper elastically coupling arrangement is constituted to be flexible in the vehicle longitudinal direction and hard in the vehicle transverse direction, and therefore the upper portion of the lower knuckle member 41B is coupled through the upper elastically coupling arrangement with the upper knuckle member 41A so as to be easy to move in the vehicle longitudinal direction and hard to move in the vehicle transverse direction.

Further, in the lower elastically coupling arrangement including the lower connecting projections 42b, the lower portion of the lower knuckle member 41B is coupled with the lower connecting projections 42b through an elastic bushing sleeve 44 oriented to extend axially in the vehicle longitudinal direction and a bolt 45 which passes through the lower connecting projections 42b and the elastic bushing sleeve 44. The lower portion of the lower knuckle member 41B is positioned between the lower connecting projections 42b with a space at each side thereof and the bolt 45 is disposed to extend in the vehicle longitudinal direction. Accordingly, the lower elastically coupling arrangement is constituted to be flexible in the vehicle longitudinal direction and hard in the vehicle transverse direction, and therefore the lower portion of the lower knuckle member 41B is coupled through the lower elastically coupling arrangement with the upper knuckle member 41A so as to be easy to move in the vehicle longitudinal direction and hard to move in the vehicle transverse direction.

With the fifth embodiment constituted as described above, the steerable front wheel 10 is easily moved in the vehicle longitudinal direction in response to an external force applied thereto, similarly to the first embodiment.

Figure 11:
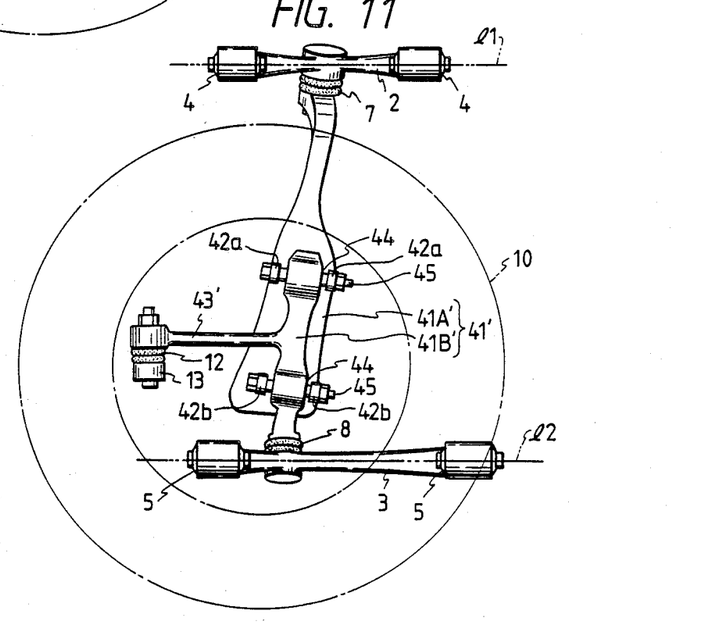
FIG. 11 is a side view showing a sixth embodiment of suspension system for a vehicle according to the present invention.

FIG. 11 shows the sixth embodiment. In the sixth embodiment, a knuckle structure 41' which comprises upper and lower knuckle members 41A' and 41B' is provided. The upper knuckle member 41A' is provided with a wheel spindle (not shown in FIG. 11) on which a steerable front wheel 10 is mounted and the upper and lower connecting projections 42a and 42b, and the lower knuckle member 41B' is provided with a knuckle arm 43' which is connected through a ball joint 12 with a tie rod 13. Other potions are constituted in the same manner as the fifth embodiment.

Figure 12:
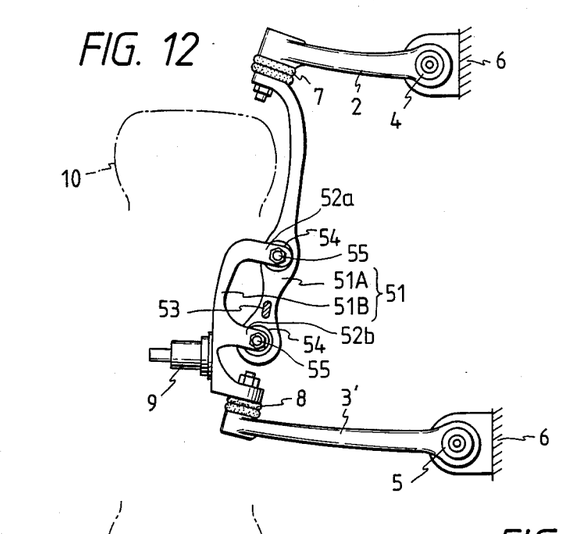
FIG. 12 is a front view showing a seventh embodiment of suspension system for a vehicle according to the present invention.
Figure 13:
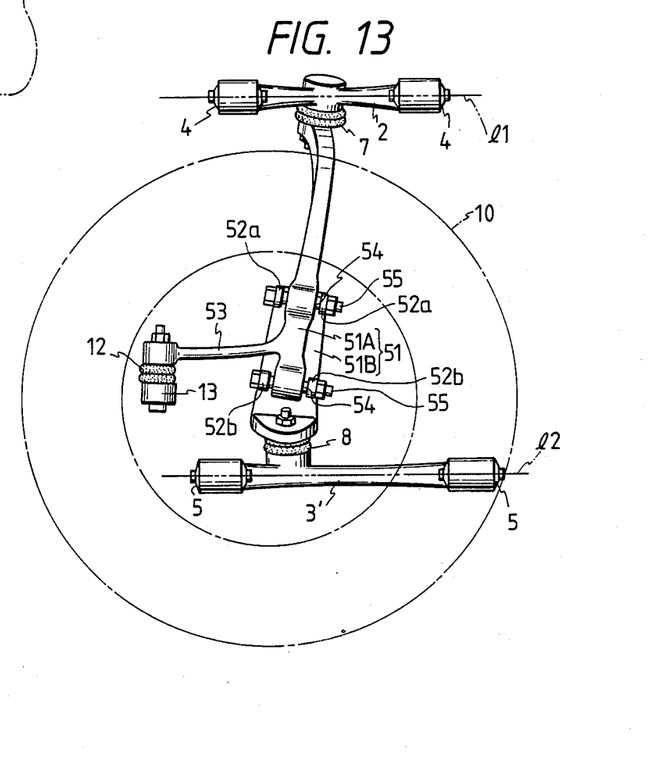
FIG. 13 is a side view showing the seventh embodiment.

FIGS. 12 and 13 show the seventh embodiment. In the seventh embodiment, a knuckle structure 51 which comprises an upper knuckle member 51A supported by an upper suspension arm 2 and a lower knuckle member 51B supported by a lower suspension arm 3', is provided.

The lower knuckle member 51B is provided with a wheel spindle 9 on which a steerable front wheel 10 is mounted and the upper knuckle member 51A is provided with a knuckle arm 53 which is connected through a ball joint 12 with a tie rod 13. The lower knuckle member 51B is further provided with a pair of upper connecting projections 52a and a pair of lower connecting projections 52b, and the upper and lower knuckle members 51A and 51B are coupled with each other through an elastic joint structure composed of an upper elastically coupling arrangement including the upper connecting projections 52a and a lower elastically coupling arrangement including the lower connecting projections 52b.

In the upper elastically coupling arrangement including the upper connecting projections 52a, a first portion of the upper knuckle member 51A is coupled with the upper connecting projections 52a through an elastic bushing sleeve 54 and a bolt 55 which passes through the upper connecting projections 52a and the elastic bushing sleeve 54, and in the lower elastically coupling arrangement including the lower connecting projections 52b, a second portion of the upper knuckle member 51A, which is lower than the first portion of the upper knuckle member 51A, is coupled with the lower connecting projections 52b through an elastic bushing sleeve 54 and a bolt 55 which passes through the lower connecting projections 52b and the elastic bushing sleeve 54. The upper and lower elastically coupling arrangements including respectively the upper and lower connecting projections 52a and 52b provided on the lower knuckle member 51B, are operative to work similarly to the upper and lower elastically coupling arrangements in the fifth embodiment, respectively.

Figure 14:
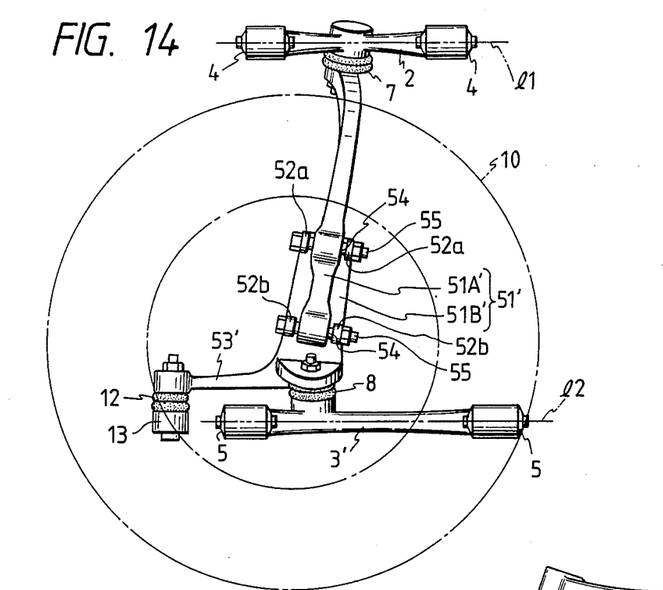
FIG. 14 is a side view showing an eighth embodiment of suspension system for a vehicle according to the present invention.

FIG. 14 shows the eighth embodiment. In the eighth embodiment, a knuckle structure 51' which comprises upper and lower knuckle members 51A' and 51B' is provided. The lower knuckle member 51B' is provided with a wheel spindle (not shown in FIG. 14) on which a steerable front wheel 10 is mounted, a knuckle arm 53' which is connected through a ball joint 12 with a tie rod 13, and upper and lower connecting projections 52a and 52b. Other potions are constituted in the same manner as the seventh embodiment.

Figure 15:
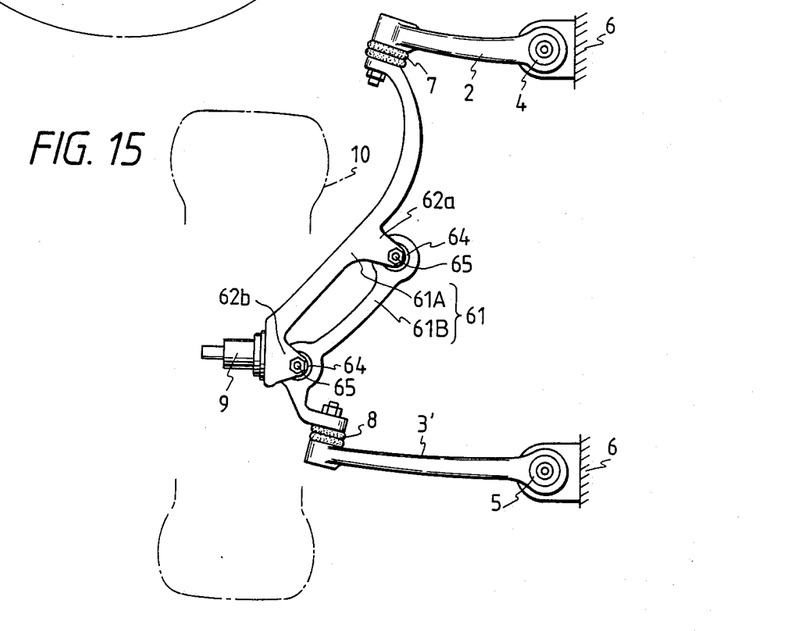
FIG. 15 is a front view showing a ninth embodiment of suspension system for a vehicle according to the present invention.

FIG. 15 shows the ninth embodiment. In the ninth embodiment, a knuckle structure 61 which comprises an upper knuckle member 61A and a lower knuckle member 61B is provided.

The upper knuckle member 61A is provided with a wheel spindle 9 on which a steerable front wheel 10 is mounted, a pair of upper connecting projections 62a and a pair of lower connecting projections 62b. The upper and lower knuckle members 61A and 61B are coupled with each other through an elastic joint structure composed of an upper elastically coupling arrangement including the upper connecting projections 62a and a lower elastically coupling arrangement including the lower connecting projections 62b.

In the upper elastically coupling arrangement including the upper connecting projections 62a, the upper portion of the lower knuckle member 61B is coupled with the upper connecting projections 62a through an elastic bushing sleeve 64 and a bolt 65 which passes through the upper connecting projections 62a and the elastic bushing sleeve 64, and in the lower elastically coupling arrangement including the lower connecting projections 62b, the lower portion of the lower knuckle member 61B is coupled with the lower connecting projections 62b through an elastic bushing sleeve 64 and a bolt 65 which passes through the lower connecting projections 62b and the elastic bushing sleeve 64.

The configuration of the ninth embodiment is similar to that of the fifth embodiment shown in FIGS. 9 and 10. However, an imaginary line passing over both the bolts 65 in the upper and lower elastically coupling arrangements in the ninth embodiment is inclined more than an imaginary line passing over both the bolts 45 in the upper and lower elastically coupling arrangements in the fifth embodiment, so that a relatively large space can be obtained between the upper knuckle member 61A and the steerable front wheel 10 in the ninth embodiment.

Figure 16:
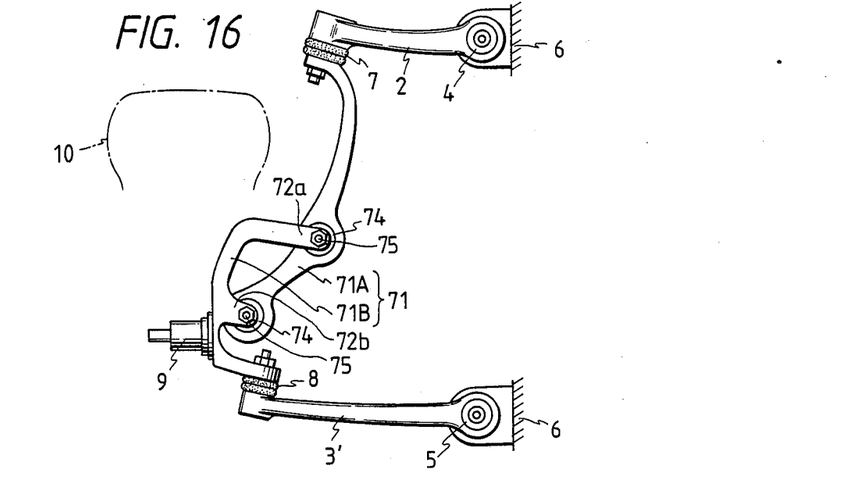
FIG. 16 is a front view showing a tenth embodiment of suspension system for a vehicle according to the present invention.

FIG. 16 shows the tenth embodiment. In the tenth embodiment, a knuckle structure 71 which comprises an upper knuckle member 71A and a lower knuckle member 71B is provided.

The lower knuckle member 71B is provided with a wheel spindle 9 on which a steerable front wheel 10 is mounted, a pair of upper connecting projections 72a and a pair of lower connecting projections 72b. The upper and lower knuckle members 71A and 71B are coupled with each other through an elastic joint structure composed of an upper elastically coupling arrangement including the upper connecting projections 72a and a lower elastically coupling arrangement including the lower connecting projections 72b.

In the upper elastically coupling arrangement including the upper connecting projections 72a, a first portion of the upper knuckle member 71A is coupled with the upper connecting projections 72a through an elastic bushing sleeve 74 and a bolt 75 which passes through the upper connecting projections 72a and the elastic bushing sleeve 74, and in the lower elastically coupling arrangement including the lower connecting projections 72b, a second portion of the upper knuckle member 71A, which is lower than the first portion of the upper knuckle member 71A, is coupled with the lower connecting projections 72b through an elastic bushing sleeve 74 and a bolt 75 which passes through the lower connecting projections 72b and the elastic bushing sleeve 74.

The configuration of the tenth embodiment is similar to that of the seventh embodiment shown in FIGS. 12 and 13. However, an imaginary line passing over both the bolts 75 in the upper and lower elastically coupling arrangements in the tenth embodiment is inclined more than an imaginary line passing over both the bolts 55 in the upper and lower elastically coupling arrangements in the seventh embodiment, so that a relatively large space can be obtained between the upper knuckle member 71A and the steerable front wheel 10 in the tenth embodiment.

Figure 17:
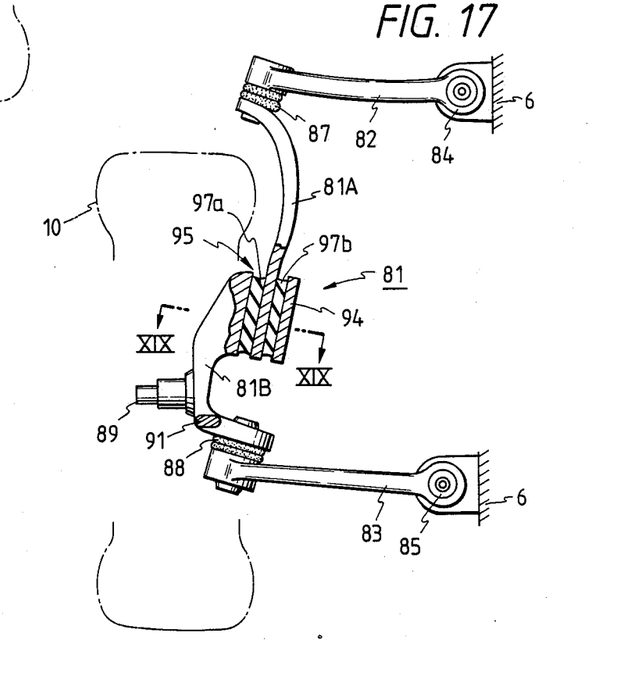
FIG. 17 is a front view showing an eleventh embodiment of suspension system for a vehicle according to the present invention.
Figure 18:
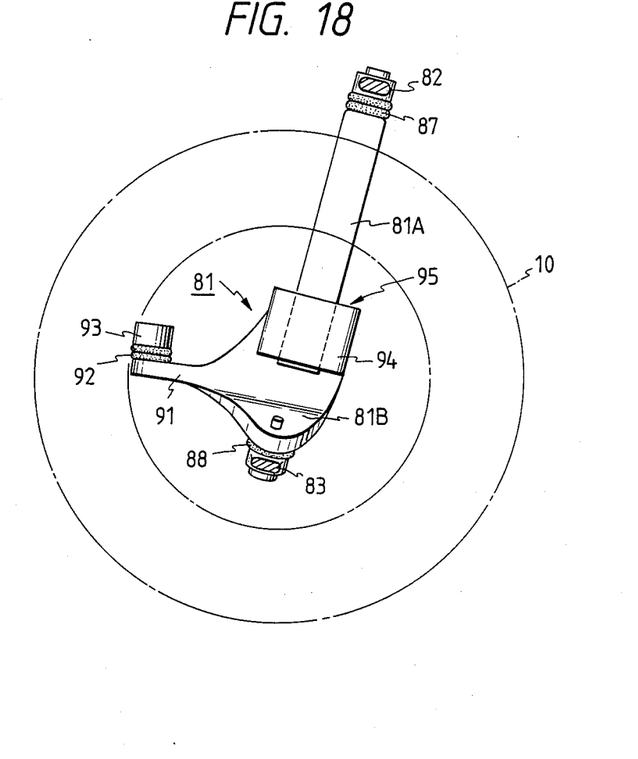
FIG. 18 is a side view showing a part of the eleventh embodiment shown in FIG. 17.

FIGS. 17 and 18 shown an eleventh embodiment of suspension system of a vehicle according to the present invention.

Referring to FIGS. 17 and 18, a knuckle structure 81 composed of upper and lower knuckle members 81A and 81B is provided for supporting a steerable front wheel 10 of a vehicle. The upper end portion of the upper knuckle member 81A is connected through a ball joint 87 with the outer end portion of an upper suspension arm 82 which extends outwardly from a body 6 of the vehicle in a vehicle transverse direction and the lower end portion of the lower knuckle member 81B is connected through a ball joint 88 with the outer end portion of a lower suspension arm 83 which extends outwardly from the body 6 in the vehicle transverse direction. The upper suspension arm 82 is shaped into a so called I-type arm to have an inner end portion coupled through an elastic bushing sleeve 84 with the body 6 rotatably, so that the upper suspension arm 82 is swingable up and down and the upper knuckle member 81A is supported by the upper suspension arm 82 to be movable up and down in relation to the body 6. The lower suspension arm 83 is also shaped into an I-type arm to have an inner end portions coupled through an elastic bushing sleeve 85 with the body 6 rotatably, so that the lower suspension arm 83 is swingable up and down and the lower knuckle member 81B is supported by the lower suspension arm 83 to be movable up and down in relation to the body 6.

The lower knuckle member 81B is provided at its lower end portion with a wheel spindle 89 extending outwardly in the vehicle transverse direction and a knuckle arm 91 extending forward in the vehicle longitudinal direction. The steerable front wheel 10 is mounted on the wheel spindle 89 to be rotatable as a driven wheel. The end portion of the knuckle arm 91 is connected through a ball joint 92 with a tie rod 93. The lower knuckle member 81B is further provided at its upper end portion with a connecting tubular portion 94, and the upper and lower knuckle members 81A and 81B are coupled with each other through an elastic joint structure 95 including the connecting tubular portion 94.

Figure 19:
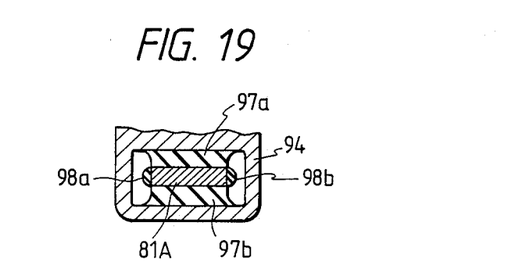
FIG. 19 is a fragmentary cross-sectional view taken on line XIX—XIX of FIG. 17.

In the elastic joint structure 95 including the connecting tubular portion 94, as shown in FIG. 19, the lower portion of the upper knuckle member 81A, which is shaped into a plate, is inserted into the connecting tubular portion 94 so as to be coupled through elastic couplers 97a and 97b with the connecting tubular portion 94. The elastic coupler 97a is disposed to extend along the connecting tubular portion 94 between one of the opposite outer surfaces of the lower portion of the upper knuckle member 81A and one of the opposite inner surfaces of the connecting tubular portion 94, which faces each other substantially in the vehicle transverse direction, and the elastic coupler 97b is disposed to extend along the connecting tubular portion 94 between the other of the opposite outer surfaces of the lower portion of the upper knuckle member 81A and the other of the opposite inner surfaces of the connecting tubular portion 94, which faces each other substantially in the vehicle transverse direction, so that the lower portion of the upper knuckle member 81A is put between the elastic couplers 97a and 97b. These lower portion of the upper knuckle member 81A and elastic couplers 97a and 97b are disposed in the connecting tubular portion 94 so as not to contact with both inner surfaces of the connecting tubular portion 94 which are opposite to each other in the vehicle longitudinal direction, and the lower portion of the upper knuckle member 81A is provided at both ends in the vehicle longitudinal direction with elastic cushion members 98a and 98b. Accordingly, the elastic joint structure 95 is constituted to be flexible in the vehicle longitudinal direction and hard in the vehicle transverse direction, and therefore the lower portion of the upper knuckle member 81A is coupled through the elastic joint structure 95 with the lower knuckle member 81B so as to be easy to move in the vehicle longitudinal direction and hard to move in the vehicle transverse direction.

With the eleventh embodiment constituted as described above, when an external force working in the vehicle longitudinal direction is applied to the steerable front wheel 10, the knuckle structure 81 is operative to have easily such deformation at the elastic joint structure 95 as to move the wheel spindle 89 together with the steerable front wheel 10 mounted thereon in the vehicle longitudinal direction, and therefore the steerable front wheel 10 is easily moved in the vehicle longitudinal direction in response to the external force. Further, since the connecting tubular portion 94 provided on the lower knuckle member 81B is relatively long to extend along the lower portion of the upper knuckle member 81A, the knuckle structure 81 is hard to incline toward the inside or outside of the body 6 and operative to keep the steerable front wheel 10 appropriate in its camber when the steerable front wheel 10 is almost zero in steering angle.

Figure 20:
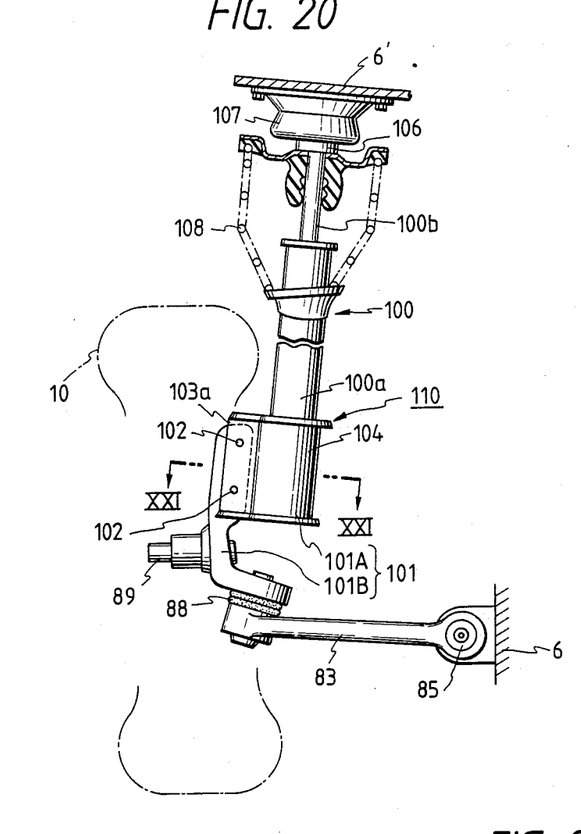
FIG. 20 is a front view showing a twelfth embodiment of suspension system for a vehicle according to the present.

FIG. 20 shows a twelfth embodiment of suspention system of a vehicle according to the present invention, and in FIG. 20, members, parts and portions corresponding to those shown in FIGS. 17 and 18 are marked with the same references and further description thereof will be omitted.

In the twelfth embodiment shown in FIG. 20, a strut 100 which comprises a spring member 108 and a shock absorber having a cylinder 100a and a piston rod 100b is provided for acting as an upper suspension arm. The piston rod 100b is connected through a mounting base 107 containing a bearing 106 with a portion 6' of a body 6 of the vehicle.

A knuckle structure 110 is constituted by the cylinder 100a functioning as an upper knuckle member and a lower knuckle member 101 having a first portion 101A and a second portion 101B fixed to the first portion 101A by bolts 102. The second portion 101B of the lower knuckle member 101 is connected through a ball joint 88 with a lower suspension arm 83 which is connected through an elastic busing sleeve 85 with the body 6 to be swingable up and down and provided with a wheel spindle 89 on which a steerable front wheel 10 is mounted.

Figure 21:
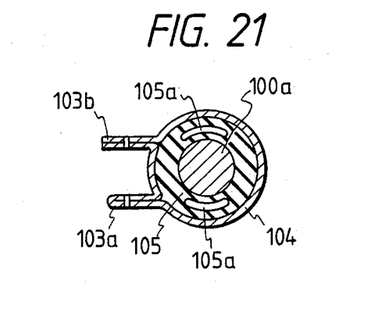
FIG. 21 is a fragmentary cross-sectional view taken on line XXI—XXI of FIG. 20.

As shown in FIG. 21, the first portion 101A of the lower knuckle member 101 is composed of a connecting tube 104 having a pair of flanges 103a and 103b for engaging with the second portion 101B of the lower knuckle member 101, and the cylinder 100a and the lower knuckle member 101 are coupled with each other through an elastic joint structure including the connecting tube 104.

In the elastic joint structure including the connecting tube 104, as shown in FIG. 21, the lower portion of the cylinder 100a, which is so indicated as to have a solid cross section for the sake of simplification in FIG. 21, is inserted into the connecting tube 104 and coupled through an elastic coupler 105 with the connecting tube 104. The elastic coupler 105 is tube-shaped to extend along the lower portion of the cylinder 100a in the connecting tube 104 and provided therein with a pair of slits 105a each extending along the connecting tube 104 to be opposite to each other with the lower portion of the cylinder 100a between in the vehicle longitudinal direction. With such slits 105a formed in the elastic coupler 105, the elastic joint structure including the connecting tube 104 is constituted to be flexible in the vehicle longitudinal direction and hard in the vehicle transverse direction, and therefore the lower portion of the cylinder 100a is coupled through the elastic joint structure with the lower knuckle member 101 so as to be easy to move in the vehicle longitudinal direction and hard to move in the vehicle transverse direction.

In the case of the twelfth embodiment also, when an external force working in the vehicle longitudinal direction is applied to the steerable front wheel 10, the knuckle structure 110 is operative to have easily such deformation at the elastic joint structure as to move the wheel spindle 89 together with the steerable front wheel 10 mounted thereon in the vehicle longitudinal direction, and therefore the steerable front wheel 10 is easily moved in the vehicle longitudinal direction in response to the external force.

What is claimed is:

1. A suspension system for a vehicle comprising:
    a wheel supporting structure provided for supporting a steerable wheel rotatably and composed of upper and lower support members, a mounting portion on which said steerable wheel is mounted and a knuckle arm used for steering said steerable wheel each being provided on either of said upper and lower support members.
    an upper suspension member extending to be movable up and down from a body of the vehicle for connecting said upper support member with the body in such a manner that said upper support member is movable up and down in relation to the body,
    a lower suspension member extending to be movable up and down from the body for connecting said lower support member with the body in such a manner that said lower support member is movable up and down in relation to the body, and
    an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction.

2. A suspension system according to claim 1, wherein said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction.

3. A suspension system for a vehicle comprising:
    a wheel supporting structure provided for supporting a steerable wheel rotatably and composed of upper and lower support members,
    an upper suspension member extending to be movable up and down from a body of the vehicle for connecting said upper support member with the body in such a manner that said upper support member is movable up and down in relation to the body,
    a lower suspension member extending to be movable up and down from the body for connecting said lower support member with the body in such a manner that said lower support member is movable up and down in relation to the body, and
    an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction, each of the upper and lower elastically coupling arrangements includes an elastic coupler which comprises a plurality of metal plates and a plurality of elastic plates arranged alternately to form an incorporated layer-built block and oriented substantially to be parallel to each other in the vehicle longitudinal direction.

4. A suspension system for a vehicle comprising:
    a wheel supporting structure provided for supporting a steerable wheel rotatably and composed of upper and lower support members,
    an upper suspension member extending to be movable up and down form a body of the vehicle for connecting said upper support member with the body in such a manner that said upper support member is movable up and down in relation to the body,
    a lower suspension member extending to be movable up and down from the body for connecting said lower support member with the body in such a manner that said lower support member is movable up and down in relation to the body, and
    an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction, each of the upper and lower elastically coupling arrangements includes an elastic coupler which comprises an elastic bushing sleeve oriented to extend axially in the vehicle longitudinal direction.

5. A suspension system for a vehicle comprising:
    a wheel supporting structure provided for supporting a steerable wheel rotatably and composed of upper and lower support members,
    an upper suspension member extending to be movable up and down from a body of the vehicle for connecting said upper support member with the body in such a manner that said upper support member is movable up and down in relation to the body,
    a lower suspension member extending to be movable up and down from the body for connecting said lower support member with the body in such a manner that said lower support member is movable up and down in relation to the body, and an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction, said upper suspension member comprises a strut comprising a spring member and a shock absorber.

6. A suspension system for a vehicle comprising:
a wheel supporting structure provided for supporting a steerable wheel rotatably and composed of upper and lower support members, an upper suspension member extending to be movable up and down from a body of the vehicle for connecting said upper support member with the body in such a manner that said upper support member is movable up and down in relation to the body, a lower suspension member extending to be movable up and down from the body for connecting said lower support member with the body in such a manner that said lower support member is movable up and down in relation to the body, and an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction, the steerable wheel is supported by the upper support member of said wheel supporting structure.

7. A suspension system according to claim 6, wherein the upper support member of said wheel supporting structure is provided with a knuckle arm.

8. A suspension system according to claim 6, wherein the lower support member of said wheel supporting structure is provided with a knuckle arm.

9. A suspension system for a vehicle comprising:
a wheel supporting structure provided for supporting a steerable wheel rotatably and composed of upper and lower support members, an upper suspension member extending to be movable up and down from a body of the vehicle for connecting said upper support member with the body in such a manner that said upper support member is movable up and down in relation to the body, a lower suspension member extending to be movable up and down from the body for connecting said lower support member with he body in such a manner that said lower support member is movable up and down in relation to the body, and an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises upper and lower elastically coupling arrangements which are provided respectively at different positions separated along said wheel supporting structure, each of said upper and lower elastically coupling arrangements being formed to be relatively flexible in the vehicle longitudinal direction and relatively hard in the vehicle transverse direction, the steerable wheel is supported by the lower support member of said wheel supporting structure.

10. A suspension system according to claim 9, wherein the upper support member of said wheel supporting structure is provided with a knuckle arm.

11. A suspension system according to claim 9, wherein the lower support member of said wheel supporting structure is provided with a knuckle arm.

12. A suspension system for a vehicle comprising:
a wheel supporting structure provided for supporting a steerable wheel rotatably and composed of upper and lower support members, an upper suspension member extending to be movable up and down from a body of the vehicle for connecting said upper support member with the body in such a manner that said upper support member is movable up and down in relation to the body, a lower suspension member extending to be movable up and down from the body for connecting said lower support member with the body in such a manner that said lower support member is movable up and down in relation to the body, and an elastic joint structure provided for coupling said lower support member with said upper support member so that said lower support member is engaged with said upper support member only through said elastic joint structure and constituted to be relatively flexible in a vehicle longitudinal direction and relatively hard in a vehicle transverse direction, said elastic joint structure comprises a tubular portion provided on one of the upper and lower support members so that the other of the upper and lower support members is inserted therein and an elastic coupler disposed in said tubular portion for coupling the other of the upper and lower support members with said one of the upper and lower support members in such a manner that the other of the upper and lower support members is easy to move in the vehicle longitudinal direction and hard to move in the vehicle transverse direction in relation to said one of the upper and lower support members.

13. A suspension system according to claim 12, wherein the upper suspension member comprises a strut comprising a spring member and a shock absorber, the upper support member of said wheel supporting structure comprises a part of said strut, and the lower support member of said wheel supporting structure is provided thereon with said tubular portion.

14. A suspension system according to claim 13, wherein the steerable wheel is supported by the lower support member of said wheel supporting structure, said lower support member being provided with a knuckle arm.

15. A suspension system according to claim 12, wherein the steerable wheel is supported by the lower support member of said wheel supporting structure.

16. A suspension system according to claim 15, wherein the lower support member of said wheel supporting structure is provided with a knuckle arm.

17. A suspension system according to claim 14, wherein said elastic coupler is tube-shaped to extend along the other of the upper and lower support members in said tubular portion and provided therein with a pair of slits which are opposite to each other with the other of the upper and lower support members between in the vehicle longitudinal direction.

18. A suspension system for a vehicle comprising:
a wheel supporting structure provided for supporting a steerable wheel rotatably and composed of upper and lower support members, said upper support member being provided with a mounting portion on which said steerable wheel is mounted and a knuckle arm used for steering said steerable wheel,
an upper suspension member extending to be movable up and down from a body of the vehicle for connecting said upper support member with the body in such a manner that said upper support member is movable up and down in relation to the body,
a lower suspension member extending to be movable up and down from the body for connecting said lower support member with the body in such a manner that said lower support member is movable up and down in relation to the body, and
a joint structure provided for coupling said lower support member with said upper support member so that said lower support member is engaged with said upper support member through said joint structure and constituted to be relatively flexible in a vehicle longitudinal direction and relatively hard in a vehicle transverse direction.

* * * * *